United States Patent [19]

Hanson

[11] Patent Number: 4,668,002
[45] Date of Patent: May 26, 1987

[54] VEHICLE TAIL GATE RAMP ASSEMBLY

[76] Inventor: Lester A. Hanson, P.O. Box 42-A, Tolna, N. Dak. 58380

[21] Appl. No.: 910,280

[22] Filed: Sep. 17, 1986

Related U.S. Application Data

[63] Continuation of Ser. No. 700,906, Feb. 12, 1985, abandoned.

[51] Int. Cl.⁴ .................. B60P 1/64; B65G 67/02; B62D 25/00
[52] U.S. Cl. .................. 296/61; 414/537; 119/82
[58] Field of Search .................. 296/50–52, 296/55, 57 R, 61, 62; 14/71.1; 414/537, 538; 119/82

[56] References Cited

U.S. PATENT DOCUMENTS

| | | | |
|---|---|---|---|
| 457,274 | 8/1891 | Hall | 296/51 |
| 684,125 | 10/1901 | Strader | 296/61 |
| 1,639,879 | 8/1927 | Buffington | 296/61 |
| 2,603,529 | 7/1952 | Troth et al. | 296/61 |
| 2,727,781 | 12/1955 | D'Eath | 296/61 |
| 2,797,960 | 7/1957 | Endres et al. | 296/61 |
| 3,025,985 | 3/1962 | Crawford | 296/57 R |
| 3,352,440 | 11/1967 | Wilson | 414/537 |
| 3,510,015 | 5/1970 | Roshaven | 296/61 |
| 3,642,156 | 2/1972 | Stenson | 296/61 |
| 3,713,553 | 1/1973 | Curtis et al. | 296/61 |
| 3,866,771 | 2/1975 | Reid et al. | 296/61 |
| 4,003,483 | 1/1977 | Fulton | 296/61 |
| 4,353,589 | 10/1982 | Hartberg | 296/50 |

Primary Examiner—Robert B. Reeves
Assistant Examiner—Dennis H. Pedder
Attorney, Agent, or Firm—Staas & Halsey

[57] ABSTRACT

A vehicle tail gate ramp including a tail gate frame movably attached to a vehicle for receiving at least two air-permeable, foldable ramps. Each ramp preferably includes first and second rectangular frame members pivotally connected to each other by a hinge. When folded, the ends of each first rectangular frame member are received by the tail gate frame to be used as a tail gate. When unfolded, the free end of each second rectangular frame member attaches to the tail gate frame and the free end of each first rectangular frame member abuts the ground to form a spaced-apart pair of loading and unloading ramps.

7 Claims, 8 Drawing Figures

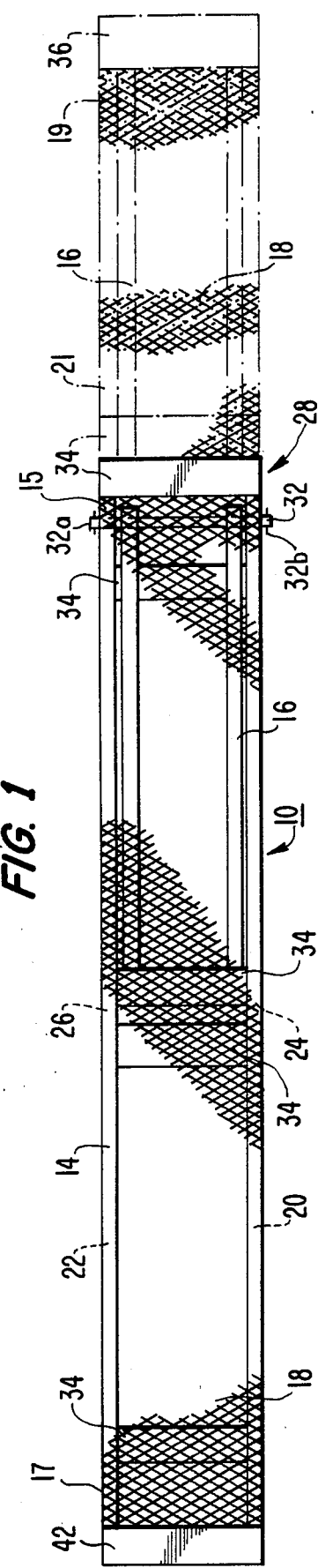
FIG. 1
FIG. 2
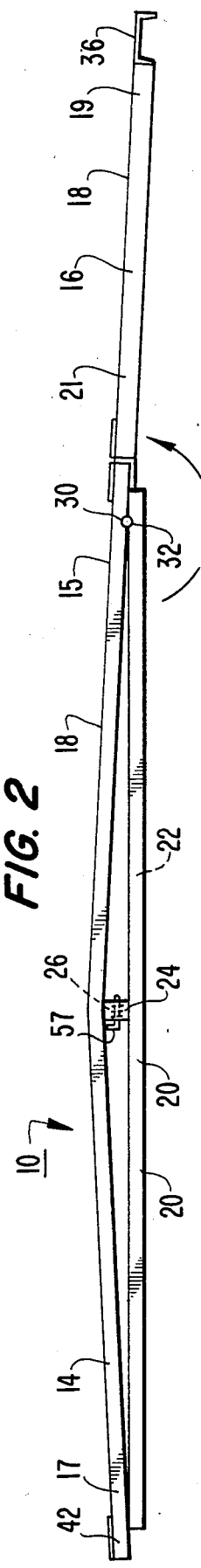
FIG. 3

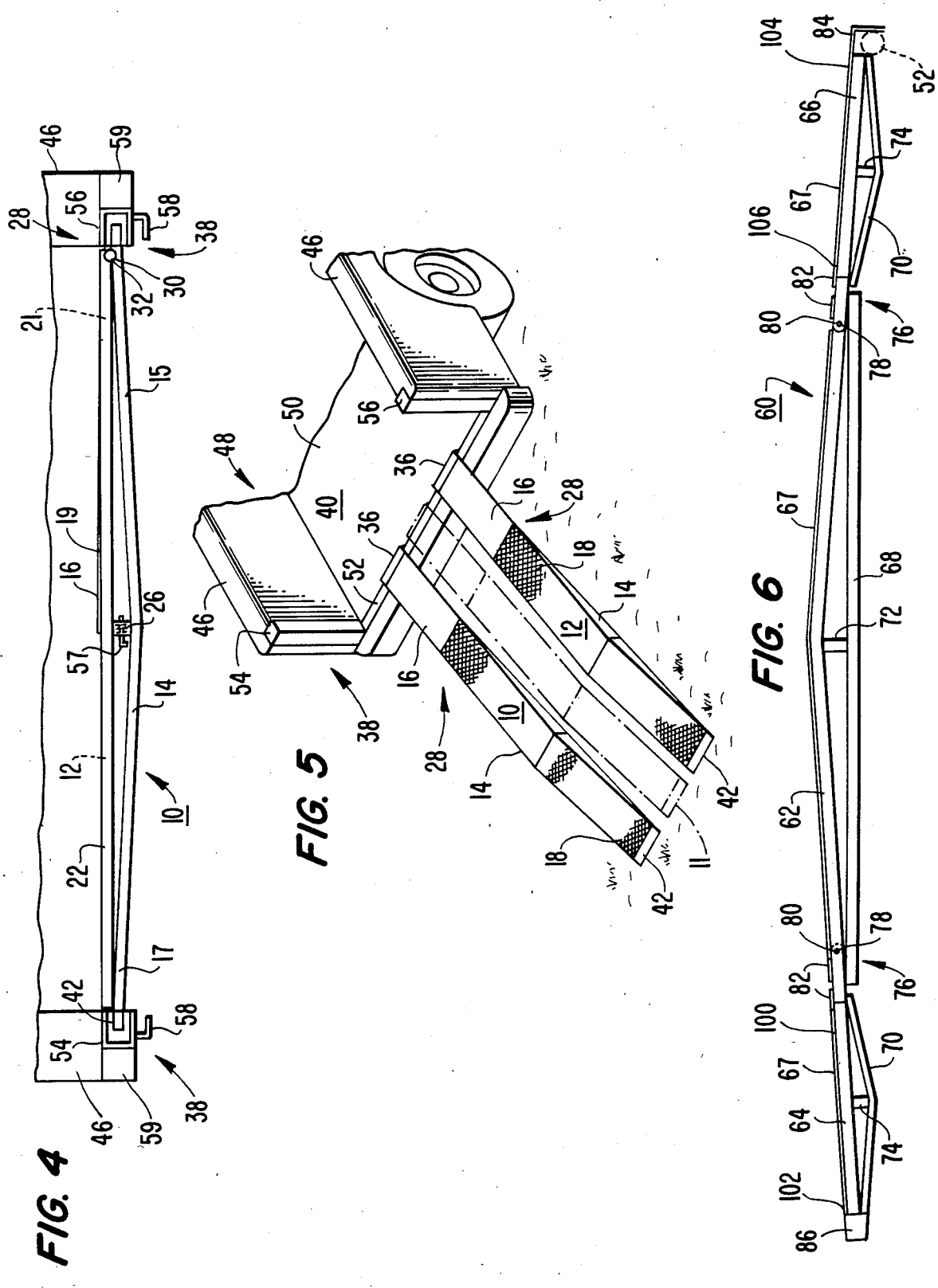

VEHICLE TAIL GATE RAMP ASSEMBLY

This is a continuation of co-pending application Ser. No. 700,906 filed on Feb. 12, 1985, now abandoned.

BACKGROUND OF THE INVENTION

This invention relates to loading and unloading devices, and more particularly, to a tail gate frame movably attached to a vehicle, wherein the frame receives a pair of air-permeable, foldable ramps to serve either in the folded state as an entire tail gate or in the unfolded state as ramps extending from the tail gate frame for loading wheeled objects onto the vehicle.

Traditionally, people used boards to load wheeled objects into vehicles. This method is unsafe, unreliable and cumbersome.

More recently, there has been provided vehicle tail gates which are capable of also being used as loading ramps. For example, each of U.S. Pat. Nos. 1,639,879 issued to Buffington; 2,603,529 issued to Troth et al.; 2,727,781 issued 'Eath; and 2,797,960 issued to Endres et al., generally discloses a tail gate ramp having at least two sections pivotally connected to form a unitary member. The tail gate is also fixedly and pivotally connected to the floor of the vehicle to allow downward movement to form a ramp.

Unfortunately, the tail gate ramps of the above-discussed patents are very heavy and difficult to use by a single person, thus, increasing the risk of worker injury. In addition, the prior art tail gates' weight and substantially solid construction increases wind resistance, decreases fuel efficiency and decreases rear visibility.

In this latter regard, vehicle tail gates are known which are partially porous to allow some air to pass therethrough. However, these tail gates are not intended to act as ramps for loading or unloading objects.

Traditionally, the objects of a vehicle tail gate which can function as a ramp and be flow-through have been mutually exclusive because a flow-through tailgate almost necessarily lacks the strength and durability required to support the weight of an object being loaded onto a vehicle. For example, even though U.S. Pat. No. 2,603,529 suggests that part of the tail gate can be flow-through to minimize wind resistance, the strength requirements of this patented device necessitate that the majority of the tail gate be made of a solid, heavy material.

In summary, the above-discussed prior art does not teach a vehicle tail gate which functions as a loading ramp, is flow through, is easy to install and use, is strong and durable and yet is relatively inexpensive to manufacture and maintain.

SUMMARY OF THE INVENTION

Accordingly, it is an object of the present invention to provide an improved vehicle tail gate which can also be used as a loading ramp, i.e., a vehicle tail gate ramp.

It is another object of the present invention to provide a vehicle tail gate ramp which can be easily and safely used by one person.

It is another object of the present invention to provide a vehicle tail gate ramp which is relatively light and flow-through so as to increase fuel efficiency, visibility and safety.

It is another object of the present invention to provide a flow-through vehicle tail gate ramp which is strong, durable, relatively inexpensive to manufacture and maintain and is relatively attractive.

It is another object of the present invention to provide a vehicle tail gate ramp assembly, including at least two sections, each separate from the other and separate from the rear of the vehicle floor, wherein each section extends in length laterally across the rear of the vehicle, and can be detached and expanded in length to form separate ramp sections to be temporarily attached to the rear of the vehicle floor.

Finally, it is an object of the present invention to provide a vehicle tail gate ramp which is adjustable for accommodating several sizes of objects to be loaded onto a vehicle and for accommodating several sizes of vehicles upon which objects are loaded.

To achieve the foregoing and other objects of the invention, and in accordance with the purposes of the invention there is provided a vehicle tail gate ramp including two separate, foldable, flow-through ramps. Each first and second section is constructed of steel tubing covered by metal mesh which allows air to pass therethrough. Each ramp is preferably made of a first longer section and a second shorter section pivotally connected to each other by a hinge. Each ramp can be folded and stored in a movable tail gate frame at the rear of a vehicle. Alternatively, the ramps can be unfolded and one end of each can be attached to the tail gate frame to form a gradual slope for loading or unloading objects relative to the vehicle. The pair of unfolded ramps can be spaced on the tail gate frame at a variety of distances, thus making them adjustable.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a top view of one ramp of the preferred embodiment of the present invention, illustrating particularly the folded state of the ramp in solid lines and the unfolded state of the ramp in phantom lines.

FIG. 2 is a side view of one ramp of the preferred embodiment of the present invention, illustrating particularly the unfolded state of the ramp.

FIG. 3 is a rear view of a vehicle with two ramps of the preferred embodiment shown in FIG. 1 folded and inserted in place of a traditional vehicle tail gate.

FIG. 4 is a top view of the two inserted ramps shown in FIG. 3.

FIG. 5 is a perspective view of the two ramps of the preferred embodiment unfolded and extending from the rear of the vehicle shown in FIGS. 3 and 4.

FIG. 6 is a side view of a ramp of an alternate embodiment of the present invention, illustrating particularly the ramp in the unfolded state.

DETAILED DESCRIPTION OF THE PREFERRED EMBODIMENTS

Figure 7:
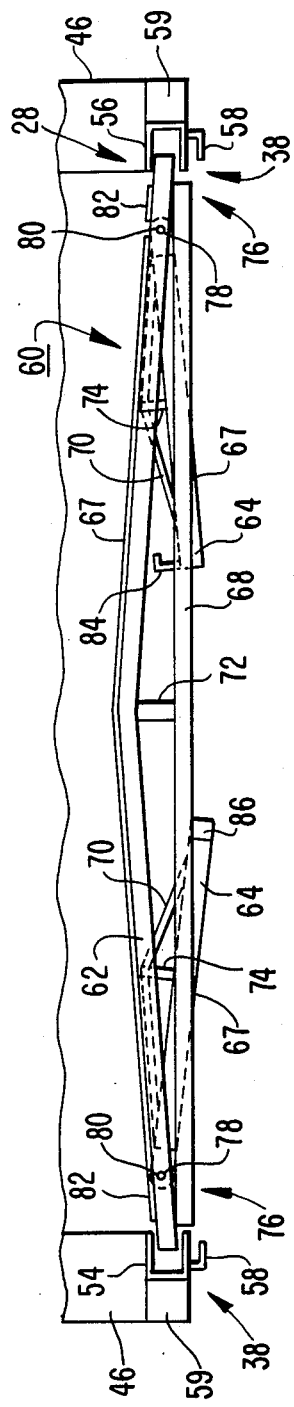
FIG. 7 is a top view of the ramp shown in FIG. 6 folded and inserted in place of a traditional vehicle tail gate.

FIG. 1 illustrates a single ramp 10 of the preferred embodiment of the present invention in both the folded and the unfolded states. However, as best shown in FIGS. 3 and 5, the vehicle tail gate ramp of the present invention actually includes two ramps 10 and 12, each identical to the other.

As best shown in FIGS. 1, 2 and 4, each ramp 10 and 12 of the preferred embodiment includes a first, larger, generally rectangular, slightly arched frame member 14 having a first end 15 and a second end 17, and a second, smaller, generally rectangular frame member 16 having a first end 19 and second end 21. On top of the first and second rectangular frame members 14 and 16 is attached an air-permeable, strong material 18, such as #10, expanded metal mesh, by, e.g., spot welding.

The first and second frame members 14 and 16 are made preferably of 1" by 1", 16 gauge, square, chromed or painted steel tubing connected by, e.g., welding. Each first rectangular frame member 14 is about 5 feet long and 9½" wide, whereas each second rectangular frame member 16 is about 2½ feet long and about 9" wide.

Along each side of each first rectangular frame member 14 there are located steel reinforcement members 20 and 22, respectively, which are connected to perpendicular support elements 24 and 26. The reinforcement members 20 and 22 and the support members 24 and 26 are preferably made of steel.

The first end 15 of each first rectangular frame member 14 is pivotally joined to the second end 21 of each second rectangular frame member 16 by hinge means 28. The hinge means 28 includes through holes 30 formed in each of the first and second rectangular members 14 and 16 and connecting means 32, for example, a removable rod 32a extending through the through holes 30 terminating in and cotter 32b pins. Each of the first and second rectangular members 14 and 16 also includes flat, rigid rectangular members 34 which provide added support, e.g., at the hinge means 28 when the first and second frame members 14 and 16 are unfolded via the hinge means 28 into a relatively coplanar relationship.

As shown in FIGS. 1, 2 and 5, the first end 19 of each second rectangular frame member 16 terminates in a rigid lip member 36 which, during use of the ramps 10 and 12 in the unfolded state, extends over a tail gate frame 38 positioned on the vehicle 40 to hold each ramp 10 and 12 in place, as will now be discussed more fully. In addition, the second end 17 of each first rectangular frame member 14 terminates in a rigid member 42 which is intended to rest on the ground when the ramps 10 and 12 are used in the unfolded state.

FIGS. 3 through 5 show the rear of the vehicle 40 having side walls 46, a body 48 and a floor 50. The tail gate frame 38 is made preferably of chromed or painted steel and is secured to the rear of the vehicle body 48. The frame member 38 receives in hooking relationship the members 36 of the second members 14 thereon when used in the unfolded state and receives the hinge means 28 and the rigid members 42 when used in the folded state.

In order to install the tail gate frame 38, the conventional tail gate is first removed from the vehicle 40, if one had been used. Then a pivoting base 52, for example, a 1½" by 68" metal tube, is extended into holes formed in the bottom of the side walls 46. In addition, a left side bracket 54 and a right side bracket 56 are connected to and ascend from the base 52 along the rear of the side walls 46 of the vehicle body 48. The left and right side brackets 54 and 56 are each preferably 2" by 2⅜", "C"-shaped members opening toward each other. Of course, different dimensions for the present invention can be used for vehicles 40 having different tail gate dimensions.

The pivoting base 52 of the tail gate frame 38 allows hinging of the entire tail gate frame 38 downwardly, including the inserted ramps 10 and 12. The conventional straps, chains or metal hinges (not shown) of a pickup truck type vehicle can be connected to the frame 38 to facilitate conventional lowering of the entire tail gate ramp assembly to act simply as a horizontal tail gate.

As can be seen, the present invention can be assembled and installed in a conventional pickup without substantial modification in a very short time. In addition, it may be disassembled and re-assembled onto a different pickup with relatively little effort.

As shown in FIG. 3, in the folded state the vehicle tail gate ramp assembly of the present invention, once installed in the tail gate frame 38, forms a completely closed tail gate arrangement. More particularly, in the folded state the hinge means 28 and the second end 17 of the first member 14 of one ramp, e.g., 12, are merely inserted vertically into the left and right brackets 54 and 56 of the tail gate frame 38. The ramp 10 is similarly inserted into the tailgate frame 38.

In addition, securing means 57, e.g., a wing nut, is tightened against or a spring loaded latch receives the folded second frame members 16 to prevent pivoting of members 16 while installed in the tail gate frame 38. Latching means 58, e.g., pivoting levers, located on the side walls 46 of the vehicle 40 or on the left and right brackets 54 and 56, respectively, are turned to secure the tail gate frame 38 in the "up" position. Finally, securing means 59, e.g., pivoting plates, are provided at the top of the left and right side brackets 54 and 56 to present upward exit of the top-most ramp installed in the tail gate frame 38 during movement of the vehicle 40.

It is important to note that the uppermost ramp has its top edge 44 substantially equal in height with the side walls 46 of the vehicle 40, i.e., about 18 inches from the vehicle floor 50, so as to form a complete and full enclosure for the vehicle body 48. However, unlike the prior art vehicle tail gate ramp assemblies, air may freely pass through the entire tail gate ramp assembly of the present invention during movement of the vehicle 40 so as to prevent unnecessary drag and, accordingly, promote greater fuel efficiency. In addition, rear visibility for the driver of the vehicle 40 is greatly enhanced and greater safety is provided since children or animals moving behind the vehicle can be seen more easily. Finally, the floor 50 of the vehicle 40 remains cleaner since dust flows out the tail gate ramp assembly.

Figure 8:
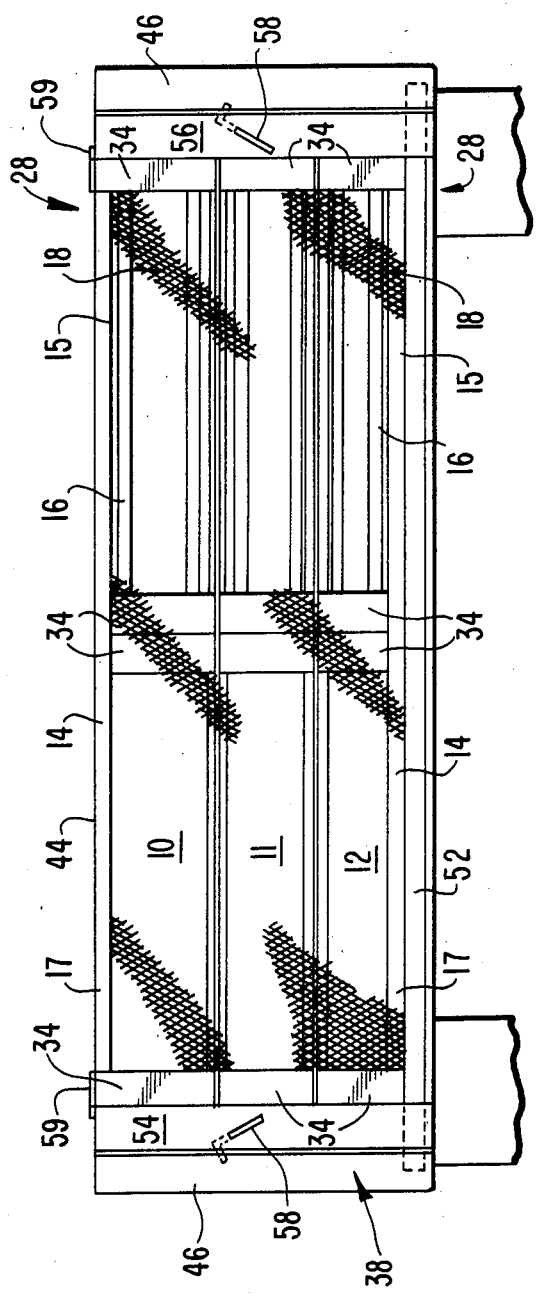
FIG. 8 is a rear view of a vehicle with three ramps of the preferred embodiment shown in FIG. 1 folded and inserted in place of a traditional vehicle tail gate.

As shown in FIG. 5, each ramp 10 and 12 of the present invention folds out to about a 7½ foot length when extended from the tail gate frame 38 and has a loading capacity of about 800-1000 pounds per ramp. Of course, other lengths of ramp can be used, as desired. Thus, two sloping ramps 10 and 12 are formed an adjustable distance apart on the frame 38 at the rear of the vehicle body 48 to facilitate loading and unloading of wheeled objects from the vehicle 40, for example, lawn mowers, snowblowers, golf carts, etc. In addition, a third identical ramp 11 can be added (shown in phantom lines in FIG. 5 and in solid lines in FIG. 8) e.g., if a three-wheeled vehicle is being loaded or unloaded.

FIG. 6 illustrates a single ramp 60 of the alternate embodiment of the present invention in the unfolded state. However, similar to the preferred embodiment, this alternate embodiment of the invention also actually includes two separate ramps which are identical to the one shown in FIG. 6.

As shown in FIG. 6, each ramp 60 of the alternate embodiment includes a main, larger, rectangular, slightly arched frame member 62 and first and second smaller rectangular end members 64 and 66. On top of the main member 62 and the first and second members 64 and 66 is attached an air-permeable, strong material 67, again, for example #10 expanded metal mesh, by spot welding running from first to second ends thereof 100 to 102 and 104 to 106, respectively.

The main member 62 and the first and second members 64 and 66 are also made preferably of 1" by 1" square steel tubing welded together. Each main rectangular frame member 62 is about 5 feet long and 9½" wide, whereas each first and second rectangular frame member 64 and 66 is about 2 feet long and about 9" wide.

As also shown in FIG. 6, along each side of the main member 62 and the first and second members 64 and 66 there is located steel reinforcement members 68 and 70, respectively, and perpendicular support elements 72 and 74, respectively. The reinforcement members 68 and 70 and the support members 72 and 74 are preferably made of steel.

The first and second rectangular frame members 64 and 66 are pivotally joined to the main member 62 by identical hinge means 76, each of which includes through holes 78 formed in the first main member 62 and the first and second rectangular members 64 and 66 and connecting means 80, e.g., rod and cotter pin combinations. Each first and second member 64 and 66 also includes flat, rigid members 82 which provide added support, e.g., at the hinge means 76 when the first and second frame members 64 and 66 are unfolded via the hinge means 76 into a relatively coplanar relationship to the main frame member 62.

Similar to the embodiments shown in FIGS. 2–5, the alternate embodiment of the tail gate ramp of the present invention shown in FIG. 6 cooperates with the tail gate frame 38. More particularly, in the folded state, both of the hinge means 76 of each ramp 60 are received by the left and right side brackets 54 and 56 (shown in FIGS. 3–5). Alternatively, the free end of each second rectangular frame member 66 opposite the hinge means 76 terminates in a rigid lip member 84 which, during use of the ramps 60 in the unfolded state, hooks over the base 52 of the frame member 38 on the vehicle 40 to hold each ramp 60 in place. In addition, the end of the second rectangular frame member 64 opposite the hinge means 76 terminates in a rigid member 86 which is intended to rest on the ground when the tail gate ramp 60 is used in the unfolded state.

As seen, the present invention can be easily used as a loading ramp or as a tail gate. In addition the invention provides little air resistance, thus improving fuel efficiency, rear visibility and safety. Further, this invention installs in minutes using conventional tail gate mounting hardware. Finally, the ramps can be adjusted to any width and hook in place for further safety.

The foregoing is considered illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention and the appended claims and their equivalents.

Accordingly, although this assembly has been described to be used most preferably with pickup trucks for loading and unloading wheeled vehicles, e.g., lawnmowers, it is not intended that the present invention be limited only to such use. For example, in either embodiment described above, a third foldable ramp can be used, as suggested above, to facilitate loading of three-wheeled vehicles or snowmobiles.

We claim:

1. A vehicle tail gate ramp assembly, comprising:
   (a) a first tail gate member having a pivoting base and two side extensions extending therefrom attached to the vehicle for movement between a substantially vertical and a substantially horizontal position;
   (b) separate second and separate third air-permeable, relatively rigid members of equal length adapted to be removably received by the first member;
   wherein each second and third member includes
      (i) a first element having a first end and a second end, and
      (ii) a second element having a first end and a second end,
   wherein the second end of the second element is pivotally connected to the first end of the first element by first hinge means between a first position substantially coplanar with the first element and a second position at an angle to the first element,
   wherein, when each second element is in the first position and the first member is in the substantially vertical position, the first end of each second element can be received by the base of the first, movable member, with the second and third members substantially parallel and in spaced relation to form ramp means extending from the vehicle, and,
   wherein, when each second element is in the second position and the first member is in the substantially vertical position, the first and second ends of each respective first element can be removably received by the side extensions of the first, movable member so that the first, second and third members form a substantially air-permeable tail gate for the vehicle.

2. The assembly as recited in claim 1, wherein at least one of the first and second elements comprises:
   a metal rectangular frame having metal mesh attached thereto and reinforcing means extending substantially from the first end to the second end thereof.

3. The assembly as recited in claim 2, wherein the first end of each second element comprises:
   a rigid lip member capable of being received in hooking relation by the base of the first member when the second elements are in the first position.

4. The assembly as recited in claim 3, wherein each second and third member further comprises:
   a third element having a first end and a second end, the first end thereof being pivotally connected to the second end of the first element by a second hinge means between a first position substantially coplanar with the first element and a second position at an angle to the first element,
   wherein, when the second and third elements are in the first position and the first member is in the substantially vertical position, the first end of each second element can be received by the base of the first member, with the second and third members substantially parallel and in spaced relation to form ramp means extending from the vehicle and, wherein, when the second and third elements are in the second position and the first member is in the substantially vertical position, the first and second ends of each respective first element can be received by the side extensions of the first, movable member so that the first, second and third members form a substantially airpermeable tail gate for the vehicle.

5. The assembly as recited in claim 4, wherein the third element comprises:

a metal rectangular frame having metal mesh attached thereto and reinforcing means extending substantially from the first end thereof to the second end thereof.

6. The assembly as recited in claim 5, wherein the first and second hinge means comprise:

(i) a plurality of colinear holes formed in each of the ends of the first, second and third elements connected by the hinge means, and (ii) a rod extending through each of the plurality of colinear holes.

7. The assembly recited in claim 1, further comprising:

a separate fourth, air-permeable, relatively rigid member also adapted to be removably received by the first member, including (i) a first element having a first end and a second end, and (ii) a second element having a first end and a second end, wherein the second end of the second element is pivotally connected to the first end of the first element by first hinge means between a first position substantially coplanar with the first element and a second position at an angle to the first element, wherein, when each second element is in the first position and the first member is in the substantially vertical position, the first end of each second element can be received by the base of the first, movable member, with the second and third members substantially parallel and in spaced relation to form ramp means extending from the vehicle, and wherein, when the second element is in the second position and the first member is in the substantially vertical position, the first and second ends of each respective first element can be removably received by the first, movable member so that the first, second, third and fourth members form a substantially air-permeable tail gate for the vehicle.

* * * * *